(12) United States Patent
Kikuchi

(10) Patent No.: US 11,667,157 B2
(45) Date of Patent: Jun. 6, 2023

(54) TIRE

(71) Applicant: SUMITOMO RUBBER INDUSTRIES, LTD., Hyogo (JP)

(72) Inventor: Hiroshi Kikuchi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 24 days.

(21) Appl. No.: 17/555,662

(22) Filed: Dec. 20, 2021

(65) Prior Publication Data

US 2022/0203771 A1 Jun. 30, 2022

(30) Foreign Application Priority Data

Dec. 28, 2020 (JP) .............................. JP2020-218657

(51) Int. Cl.
*B60C 11/00* (2006.01)
*B60C 11/01* (2006.01)
*B60C 11/03* (2006.01)

(52) U.S. Cl.
CPC ........ *B60C 11/0083* (2013.01); *B60C 11/005* (2013.01); *B60C 11/0327* (2013.01); *B60C 2011/0025* (2013.01); *B60C 2011/0033* (2013.01)

(58) Field of Classification Search
CPC .............. B60C 11/0041; B60C 11/005; B60C 11/0083
See application file for complete search history.

(56) References Cited

U.S. PATENT DOCUMENTS

2010/0130663 A1* 5/2010 Taguchi ................ B60C 11/005
524/432

FOREIGN PATENT DOCUMENTS

| EP | 1033234 A2 * | 9/2000 | ......... B29D 30/0601 |
| JP | 11321214 A * | 11/1999 | ......... B60C 11/0083 |
| JP | 2011121409 A * | 6/2011 | |
| JP | 2018-2008 | 1/2018 | |
| JP | 2018002008 A * | 1/2018 | |

OTHER PUBLICATIONS

Machine Translation: EP-1033234-A2, Peter J, (Year: 2023).*
Machine Translation: JP-2018002008-A, Sueno J, (Year: 2023).*
Machine Translation: JP-11321214-A, Koyama K, (Year: 2023).*
Machine Translation: JP-2011121409-A, Iwasaki N, (Year: 2023).*

* cited by examiner

*Primary Examiner* — Kendra Ly
(74) *Attorney, Agent, or Firm* — Greenblum & Bernstein, P.L.C.

(57) ABSTRACT

In a tire, a tread includes a cap layer forming a part of the outer surface of the tire, an intermediate layer disposed inwardly of the cap layer in the radial direction, and a base layer disposed inwardly of the intermediate layer in the radial direction. A loss tangent of the intermediate layer at 30° C. is less than a loss tangent of the cap layer at 30° C., and a loss tangent of the base layer at 30° C. is less than the loss tangent of the intermediate layer at 30° C. An outer end of the cap layer is disposed outwardly of an outer end of the base layer in the axial direction. In the radial direction, a position of the outer end of the cap layer coincides with a position of the outer end of the base layer, or the outer end of the cap layer is disposed inwardly of the outer end of the base layer.

19 Claims, 7 Drawing Sheets

TIRE

CROSS REFERENCE TO RELATED APPLICATION

The present application claims priority to Japanese patent application JP 2020-218657, filed on Dec. 28, 2020, the entire contents of which are incorporated herein by reference in its entirety.

BACKGROUND

Technical Field

The present disclosure relates to a tire.

Description of the Background Art

A tire having low rolling resistance is obtained by using rubber having a low-heat-generation property in a tread. A grip force of the rubber having a low-heat-generation property is lower as compared with rubber having a heat generation property that allows a high grip force to be exhibited. Therefore, in a case where rubber having a low-heat-generation property is used in a tread, for example, braking performance (hereinafter, also referred to as wet performance) on a wet road surface is degraded. It is difficult to obtain good balance between rolling resistance and wet performance. Various studies have been made in order to achieve reduction of rolling resistance and enhancement of wet performance (for example, see Japanese Laid-Open Patent Publication No. 2018-2008).

A tire is required to exhibit enhanced wet performance during cornering as well as enhanced wet performance during straight running according to a speed of a vehicle being increased. In order to enhance wet performance, use of rubber capable of exhibiting a high grip force in a tread is examined. Since rubber capable of exhibiting a high grip force is likely to generate heat, rolling resistance of the tire is increased. A technique for allowing enhancement of wet performance during cornering without increasing rolling resistance is required to be established.

The present disclosure has been made in view of such circumstances, and an object of the present disclosure is to provide a tire that allows enhancement of wet performance during cornering without increasing rolling resistance.

SUMMARY

A tire according to one aspect of the present disclosure includes a tread configured to come into contact with a road surface. An outer surface of the tire includes a tread surface and a pair of side surfaces continuous with ends of the tread surface. On a meridian cross-section of the tire, a contour of the tread surface includes a plurality of curved contour lines formed as arcs having different radii. A contour of the outer surface of the tire includes, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion. A tread reference end is an intersection point of the outer surface of the tire, and a straight line extending in a radial direction through an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other. An axial distance from an equator plane to the tread reference end is a tread half-width. The tread includes a cap layer forming a part of the outer surface of the tire, an intermediate layer disposed inwardly of the cap layer in the radial direction, and a base layer disposed inwardly of the intermediate layer in the radial direction. A loss tangent of the intermediate layer at 30° C. is less than a loss tangent of the cap layer at 30° C., and a loss tangent of the base layer at 30° C. is less than the loss tangent of the intermediate layer at 30° C. An outer end of the cap layer is disposed outwardly of an outer end of the base layer in the axial direction. A position of the outer end of the cap layer coincides with a position of the outer end of the base layer in the radial direction, or the outer end of the cap layer is disposed inwardly of the outer end of the base layer in the radial direction.

DESCRIPTION OF THE PREFERRED EMBODIMENTS

Figure 1:
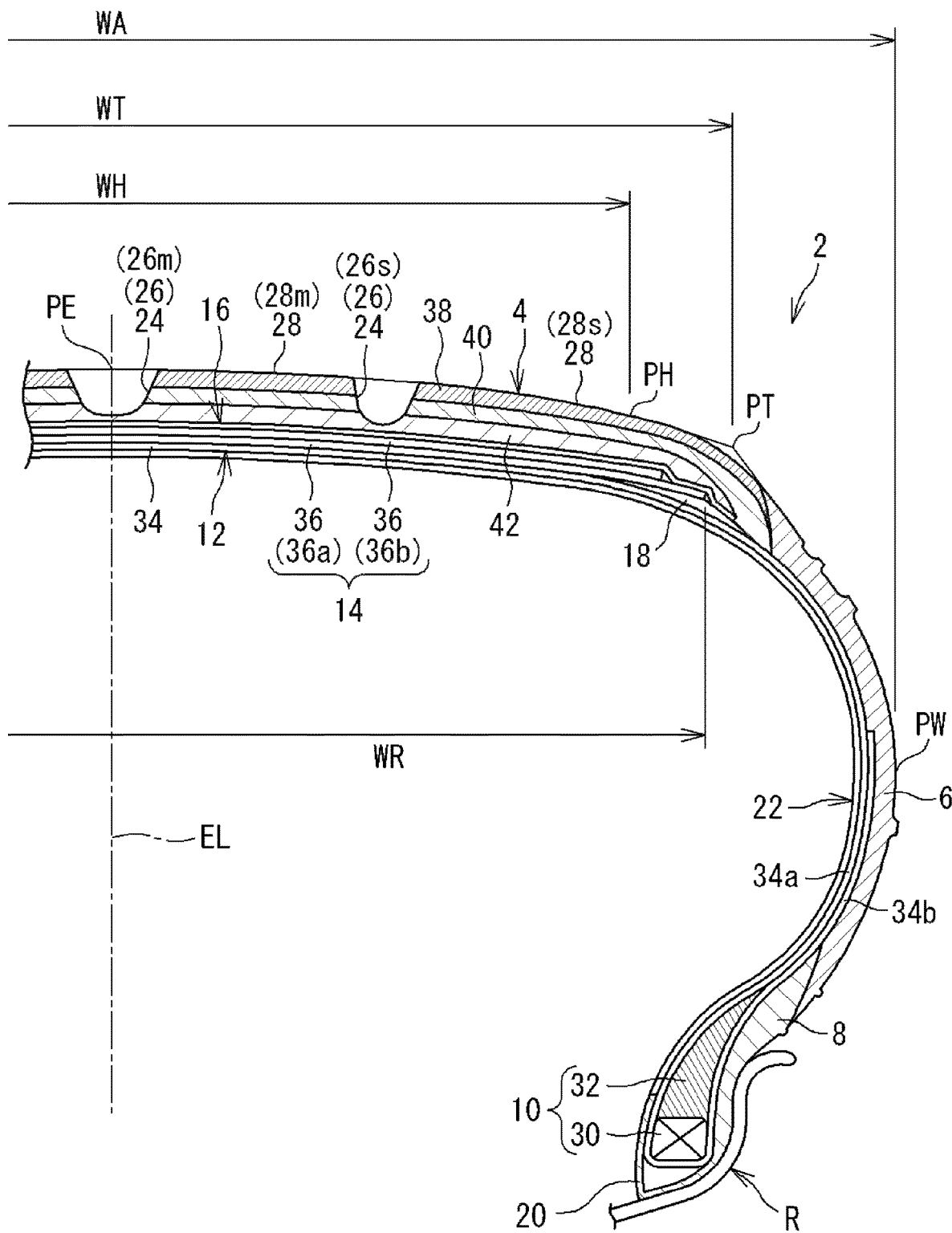
FIG. 1 is a cross-sectional view of a part of a tire according to one embodiment of the present disclosure.

The present disclosure will be described below in detail based on a preferred embodiment with appropriate reference to the drawings.

In the present disclosure, a state where a tire is mounted on a normal rim, an internal pressure of the tire is adjusted to a normal internal pressure, and no load is applied to the tire is referred to as a normal state.

In the present disclosure, unless otherwise specified, dimensions and angles of components of the tire are measured in the normal state. In a case where dimensions and angles of components on a meridian cross-section of a tire cannot be measured in a state where the tire is mounted on a normal rim, the dimensions and angles are measured by conforming a distance between left and right beads to a distance between beads of a tire mounted on a normal rim, on a cross-section of the tire which is obtained by cutting the tire along a plane including a rotation axis.

The normal rim represents a rim defined by a standard on which the tire is based. Examples of the normal rim include the "standard rim" in the JATMA standard, the "Design Rim" in the TRA standard, and the "Measuring Rim" in the ETRTO standard.

The normal internal pressure represents an internal pressure defined by a standard on which the tire is based. Examples of the normal internal pressure include the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard.

The normal load represents a load defined by a standard on which the tire is based. Examples of the normal load include the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard.

In the present disclosure, crosslinked rubber refers to a molded product, of a rubber composition, obtained by pressurizing and heating the rubber composition. The rubber composition is uncrosslinked rubber obtained by mixing base rubber and chemicals in a kneading machine such as a Banbury mixer. The crosslinked rubber is also referred to as vulcanized rubber and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile butadiene rubber (NBR), and isobutylene-isoprene-rubber (IIR). Examples of the chemicals include a reinforcing agent such as carbon black and silica, a plasticizer such as aromatic oil, a filler such as zinc oxide, a lubricant such as stearic acid, an antioxidant, a processing aid, sulfur, and a vulcanization accelerator. Selection of the base rubber and the chemicals, contents of the selected chemicals, and the like are determined as appropriate according to the specifications of the component, such as a tread and sidewalls, to which the rubber composition is applied.

In the present disclosure, a loss tangent (also referred to as tanδ), at a temperature of 30° C., of a component formed of the crosslinked rubber among components of the tire is measured by using a viscoelasticity spectrometer ("VES" manufactured by Iwamoto Seisakusho) under the following conditions in accordance with the standard of JIS K6394.

Initial strain=10%
Dynamic strain=2%
Frequency=10 Hz
Deformation mode=tension

In this measurement, a test piece is sampled from the tire. In a case where a test piece cannot be sampled from the tire, a test piece is sampled from sheet-shaped crosslinked rubber (hereinafter, also referred to as rubber sheet) obtained by pressurizing and heating a rubber composition used for forming a component to be measured, at a temperature of 170° C., for 12 minutes.

In the present disclosure, a LAT abrasion index represents an index for evaluating abrasion resistance of a component formed of crosslinked rubber among components of the tire. For the component to be evaluated, the greater the LAT abrasion index is, the more excellent abrasion resistance is.

The LAT abrasion index is measured by using a friction tester, for example, a LAT tester (Laboratory Abrasion and Skid Tester) such as LAT100 (manufactured by VMI). In this measurement, a rubber composition used for forming a component to be measured is vulcanized and molded in a mold for a test piece at 170° C. for 20 minutes to prepare the test piece. A volume loss (volume loss of the component to be evaluated) of the test piece is measured by using the test piece under the conditions that a load is 50 N, a speed is 20 km/h, and a slip angle is 5°. A volume loss (reference volume loss) of a rubber composition as a reference is similarly measured. A LAT abrasion index of the component to be evaluated is obtained by using the volume loss of the component to be evaluated and the reference volume loss according to the following expression.

LAT abrasion index=(reference volume loss/volume loss of component to be evaluated)×100

The LAT abrasion index represents a volume loss, of a component to be evaluated, which is represented as an index with the index of the reference volume loss being 100. The rubber composition as a reference is not particularly limited. For example, in a case where the LAT abrasion index of a component forming a tread is to be obtained, a rubber composition for a cap layer of a conventional tread formed of two layers that are the cap layer and a base layer is used as a rubber composition serving as the reference.

FIG. 1 shows a part of a tire 2 according to one embodiment of the present disclosure. The tire 2 is for a passenger car. FIG. 1 shows a part of a cross-section (hereinafter, also referred to as a meridian cross-section) of the tire 2 taken along a plane including the rotation axis of the tire 2. In FIG. 1, the left-right direction represents an axial direction of the tire 2, and the up-down direction represents a radial direction of the tire 2. The direction perpendicular to the surface of the drawing sheet in FIG. 1 represents a circumferential direction of the tire 2.

In FIG. 1, an alternate long and short dash line EL represents an equator plane of the tire 2. The tire 2 has a shape that is symmetric about the equator plane except for a tread pattern and decorative portions such as patterns and characters formed at the outer surface.

In FIG. 1, the tire 2 is mounted on a rim R. The rim R is a normal rim. The inside of the tire 2 is inflated with air to adjust an internal pressure of the tire 2. The tire 2 mounted on the rim R is also referred to as a tire-rim complex. The tire-rim complex includes the rim R and the tire 2 mounted on the rim R.

In FIG. 1, a position represented by reference character PW is an outer end of the tire 2 in the axial direction. In a case where a decorative portion such as a pattern or a character is on the outer surface, the outer end PW is specified based on an imaginary outer surface obtained on the assumption that no decorative portion is provided.

In FIG. 1, a length represented by reference character WA is the maximal width, that is, a cross-sectional width (see JATMA or the like) of the tire 2. The cross-sectional width WA of the tire 2 represents a distance in the axial direction from one of the outer ends PW to the other of the outer ends PW. The outer end PW represents a position (hereinafter, referred to as maximal width position) at which the tire 2 has the maximal width. The cross-sectional width WA is measured in the tire 2 in the normal state.

The tire 2 includes a tread 4, a pair of sidewalls 6, a pair of clinches 8, a pair of beads 10, a carcass 12, a belt 14, a band 16, a pair of cushions 18, a pair of chafers 20, and an inner liner 22.

The tread 4 comes into contact with a road surface at the outer surface of the tread 4. The tread 4 has grooves 24. Thus, a tread pattern is formed.

In the tire 2, at least three circumferential grooves 26 extending continuously in the circumferential direction are formed in the tread 4. Thus, at least four land portions 28 aligned in the axial direction are formed in the tread 4. The tire 2 shown in FIG. 1 has the three circumferential grooves 26 formed in the tread 4, so that the four land portions 28 are formed. The circumferential grooves 26 form a part of the grooves 24 forming the tread pattern.

In FIG. 1, a position represented by reference character PE represents the equator of the tire 2. The equator PE is an intersection point of the outer surface of the tread 4 and the equator plane. As shown in FIG. 1, in a case where the groove 24 is formed at the equator plane, the equator PE is specified based on an imaginary outer surface of the tread 4 obtained on the assumption that the groove 24 is not provided.

Each sidewall 6 is continuous with the end of the tread 4. The sidewall 6 is disposed inwardly of the tread 4 in the radial direction. The sidewall 6 extends along the carcass 12 from the end of the tread 4 toward the clinch 8. The sidewall 6 is formed of crosslinked rubber produced in consideration of cut resistance.

Each clinch 8 is disposed inwardly of the sidewall 6 in the radial direction. The clinch 8 comes into contact with the rim R. The clinch 8 is formed of crosslinked rubber produced in consideration of abrasion resistance.

Each bead 10 is disposed inwardly of the clinch 8 in the axial direction. The bead 10 includes a core 30 and an apex 32. The core 30 includes a steel wire which is not shown.

The apex 32 is disposed outwardly of the core 30 in the radial direction The apex 32 is tapered outwardly. The apex 32 is formed of crosslinked rubber having a high stiffness.

The carcass 12 is disposed inwardly of the tread 4, the pair of sidewalls 6, and the pair of clinches 8. The carcass 12 extends on and between one of the beads 10 and the other of the beads 10. The carcass 12 has a radial structure.

The carcass 12 includes at least one carcass ply 34. The carcass 12 of the tire 2 is formed of one carcass ply 34 from the viewpoint of weight reduction.

The carcass ply 34 includes a ply body 34a and a pair of turned-up portions 34b. The ply body 34a extends on and between one of the cores 30 and the other of the cores 30. The turned-up portions 34b are continuous with the ply body 34a and are turned up around the cores 30, respectively, from the inner side toward the outer side in the axial direction. In the tire 2, the end of the turned-up portion 34b is disposed outwardly of the maximal width position PW in the radial direction.

The carcass ply 34 includes multiple carcass cords aligned with each other, which are not shown. The carcass cords are covered with topping rubber. Each of the carcass cords intersects the equator plane. The carcass cord is formed of an organic fiber. Examples of the organic fiber include nylon fibers, rayon fibers, polyester fibers, and aramid fibers.

The belt 14 is disposed inwardly of the tread 4 in the radial direction. The belt 14 is stacked on the carcass 12 from the outer side in the radial direction. In FIG. 1, a length represented by reference character WR is a width of the belt 14 in the axial direction. The axial width WR represents a distance in the axial direction from one end of the belt 14 to the other end of the belt 14. In the tire 2, the axial width WR of the belt 14 is not less than 65% of the cross-sectional width WA and not greater than 85% thereof.

The belt 14 includes at least two layers 36 stacked in the radial direction. In the tire 2, the belt 14 includes two layers 36 stacked in the radial direction. In the two layers 36, the layer 36 disposed on the inner side is an inner layer 36a, and the layer 36 disposed on the outer side is an outer layer 36b. As shown in FIG. 1, the inner layer 36a is wider than the outer layer 36b. A length from the end of the outer layer 36b to the end of the inner layer 36a is not less than 3 mm and not greater than 10 mm.

Each of the inner layer 36a and the outer layer 36b includes multiple belt cords aligned with each other, which are not shown. The belt cords are covered with topping rubber. Each of the belt cords is inclined relative to the equator plane. The material of the belt cords is steel.

The band 16 is disposed between the tread 4 and the belt 14 in the radial direction. The band 16 is stacked on the belt 14 in a portion inward of the tread 4.

The band 16 includes a helically wound band cord which is not shown. The band cord extends substantially in the circumferential direction. Specifically, an angle of the band cord relative to the circumferential direction is not greater than 5°. The band 16 has a jointless structure. In the tire 2, a cord formed of an organic fiber is used as the band cord. Examples of the organic fiber include nylon fibers, rayon fibers, polyester fibers, and aramid fibers.

In the tire 2, the band 16 is formed as a full band in which both ends oppose each other across the equator PE. The band 16 is wider than the belt 14. A length from the end of the belt 14 to the end of the band 16 is not less than 3 mm and not greater than 10 mm. The band 16 covers the entirety of the belt 14. The band 16 may include a pair of edge bands that are spaced from each other in the axial direction and cover the ends of the full band and the ends of the belt 14. The band 16 may be formed as the pair of edge bands only.

The cushions 18 are spaced from each other in the axial direction. Each cushion 18 is disposed between the ply body 34a of the carcass 12, and the end of the belt 14 and the end of the band 16. The cushion 18 is formed of crosslinked rubber having a low stiffness.

Each chafer 20 is disposed inwardly of the bead 10 in the radial direction. The chafer 20 comes into contact with the rim R. In the tire 2, the chafer 20 is formed of fabric and rubber impregnated in the fabric.

The inner liner 22 is disposed inwardly of the carcass 12. The inner liner 22 forms an inner surface of the tire 2. The inner liner 22 is formed of crosslinked rubber having a low gas permeation coefficient. The inner liner 22 retains an internal pressure of the tire 2.

In FIG. 1, a position represented by reference character PH is a position on the outer surface of the tread 4. The position PH corresponds to an axially outer end of a ground contact surface at which the tire 2 is in contact with a road surface.

The ground contact surface for specifying the position PH is obtained by using, for example, a ground contact surface shape measuring device (not shown). The ground contact surface is obtained by the device in a manner in which, in a state where a camber angle of the tire 2 in the normal state is 0°, a load that is 70% of the normal load is applied as a vertical load to the tire 2, and the tire 2 is brought into contact with a planar road surface. In the tire 2, the ground contact surface obtained in this manner is a reference ground contact surface, and a position, on the outer surface of the tread 4, corresponding to the axially outer end of the reference ground contact surface is the above-described position PH. In the tire 2, the position PH is a reference ground contact end.

Figure 2:
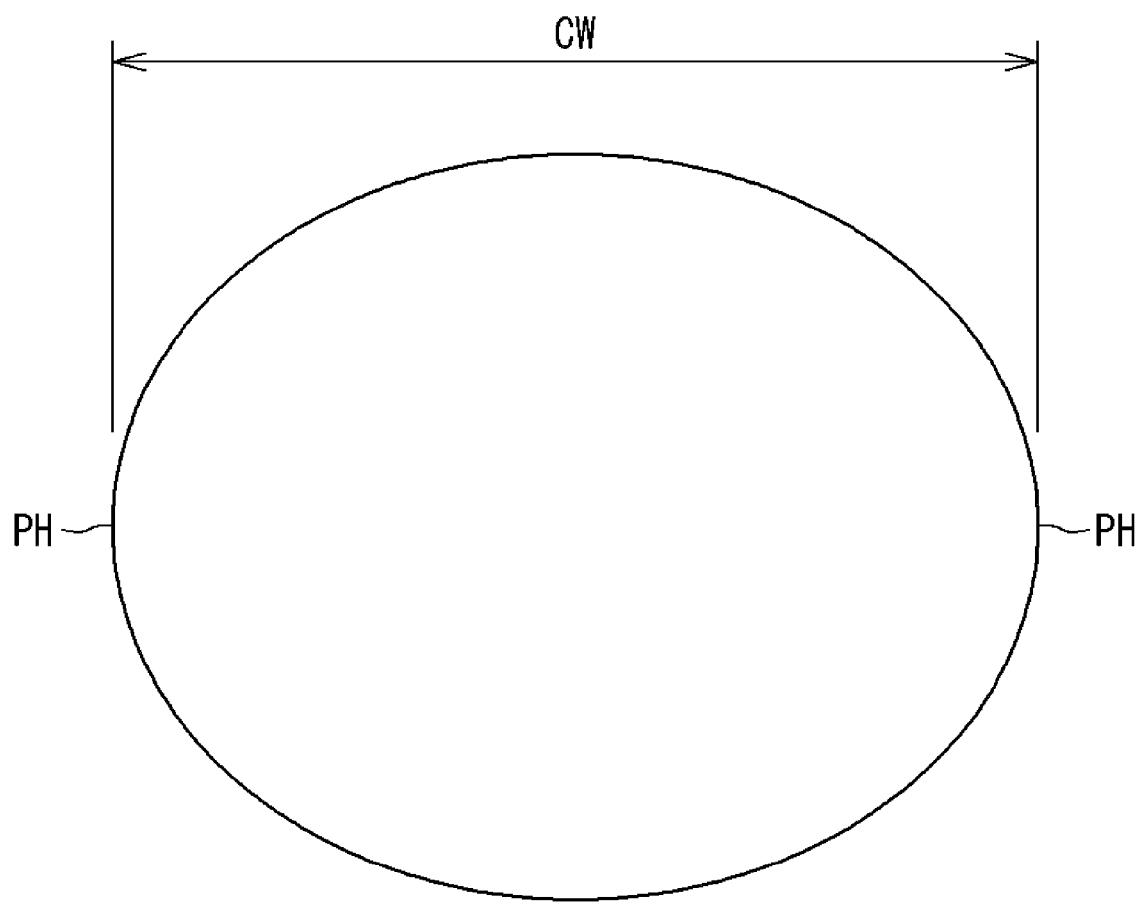
FIG. 2 shows an image for illustrating a ground contact width of a reference ground contact surface.

FIG. 2 shows an image of the reference ground contact surface. In FIG. 2, the up-down direction corresponds to the circumferential direction of the tire 2 and the left-right direction corresponds to the axial direction of the tire 2. The direction perpendicular to the surface of the drawing sheet in FIG. 2 corresponds to the radial direction of the tire 2.

In FIG. 2, a length represented by reference character CW is a ground contact width of the reference ground contact surface. The ground contact width CW represents a distance in the axial direction from one of the reference ground contact ends PH to the other of the reference ground contact ends PH. The ground contact width CW is represented as a maximal width of the reference ground contact surface. In the present disclosure, half the ground contact width CW is also referred to as a ground contact half-width HCW.

Figure 3:
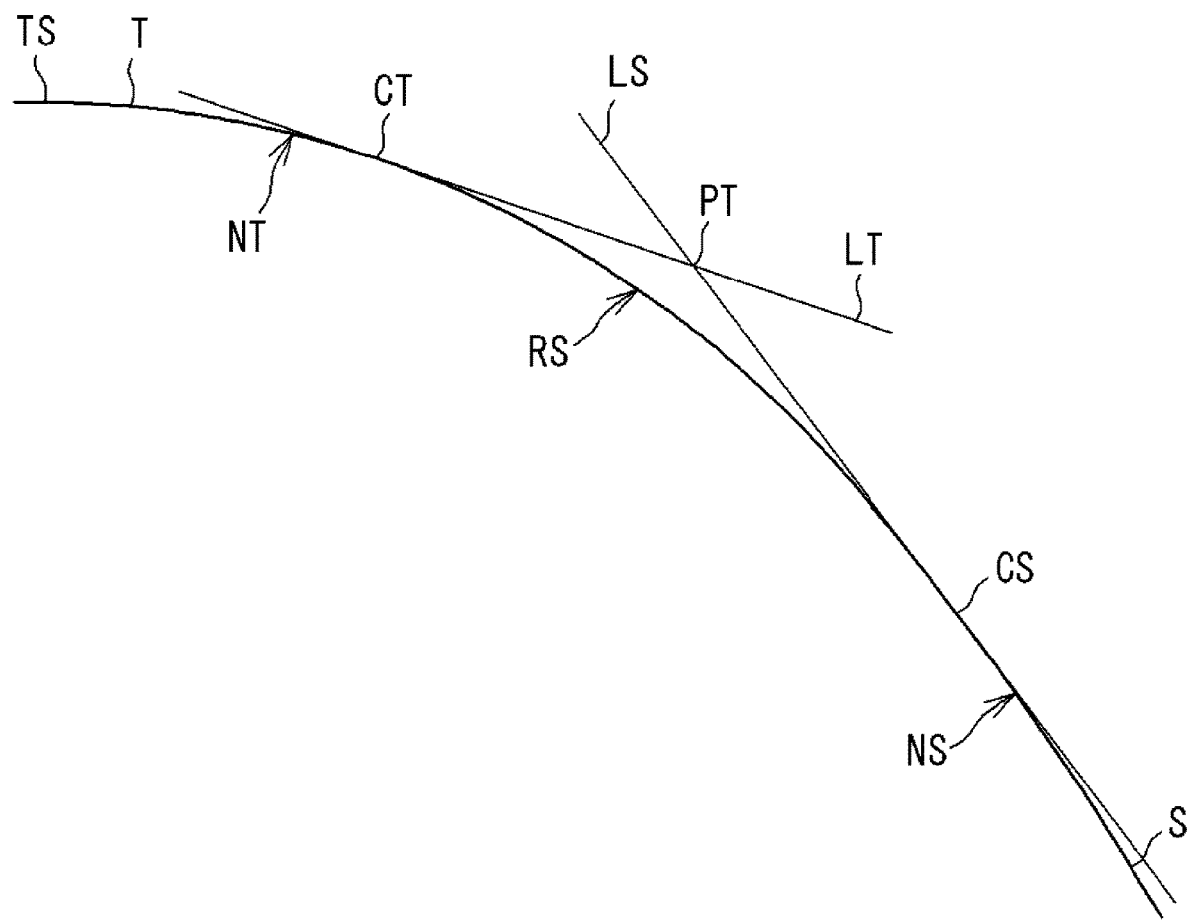
FIG. 3 is an enlarged cross-sectional view of a contour of a shoulder portion of the tire in FIG. 1.

FIG. 3 shows a part of the tire 2 in FIG. 1. In FIG. 3, the left-right direction represents the axial direction of the tire 2 and the up-down direction represents the radial direction of the tire 2. The direction perpendicular to the surface of the drawing sheet in FIG. 3 represents the circumferential direction of the tire 2.

FIG. 3 shows a contour of a shoulder portion of the tire 2 on the meridian cross-section. The contour shown in FIG. 3 is obtained by measuring the outer surface shape of the tire 2 in the normal state by a displacement sensor.

On the meridian cross-section, the contour of the outer surface (hereinafter, referred to as tire outer surface TS) of the tire 2 is formed by connecting a plurality of contour lines each formed as a straight line or an arc. In the present disclosure, the contour line formed as a straight line or an arc is simply referred to as a contour line. The contour line formed as the straight line is referred to as a straight contour line, and the contour line formed as an arc is referred to as a curved contour line.

The tire outer surface TS includes a tread surface T and a pair of side surfaces S continuous with the ends of the tread surface T. On the meridian cross-section, the contour of the tread surface T includes a plurality of curved contour lines having different radii. In the tire 2, in the plurality of curved contour lines included in the contour of the tread surface T, a curved contour line having the smallest radius is disposed at the end portion of the tread surface T and is connected to the side surface S. On the meridian cross-section, the contour of the tire outer surface TS includes, on each end portion of the tread surface T, a curved line portion that is a curved contour line connected to the side surface S and formed as an arc having the smallest radius among the plurality of curved contour lines included in the contour of the tread surface T. In FIG. 3, the curved line portion is represented by reference character RS.

On the contour of the tire outer surface TS, the curved line portion RS is in contact with a contour line (hereinafter, referred to as inner adjacent contour line NT) adjacent to the curve line portion RS on the inner side in the axial direction, at a contact point CT. The curved line portion RS is in contact with a contour line (hereinafter, referred to as outer adjacent contour line NS), forming a contour of the side surface S, adjacent to the curve line portion RS on the outer side in the axial direction, at a contact point CS. The contour of the tire outer surface TS includes the inner adjacent contour line NT that is disposed inwardly of the curved line portion RS in the axial direction and is in contact with the curved line portion RS, and the outer adjacent contour line NS that is disposed outwardly of the curved line portion RS in the axial direction and is in contact with the curved line portion RS.

In FIG. 3, a solid line LT is a line tangent to the curved line portion RS at the contact point CT at which the inner adjacent contour line NT and the curved line portion RS are in contact with each other. A solid line LS is a line tangent to the curved line portion RS at the contact point CS at which the outer adjacent contour line NS and the curved line portion RS are in contact with each other. A position represented by reference character PT is an intersection point of the tangent line LT and the tangent line LS. In the tire 2, the intersection point PT represents an imaginary tread end. A position represented by reference character Pe is an intersection point of the tire outer surface TS and a straight line extending through the imaginary tread end PT in the radial direction. The intersection point Pe is a tread reference end.

In FIG. 1, a length represented by a double-headed arrow WT is a width of the tread 4. The width of the tread 4 represents a distance in the axial direction from one of the tread reference ends Pe to the other of the tread reference ends Pe. In the tire 2, a ratio (WT/WA) of the width WT of the tread 4 to the cross-sectional width WA is not less than 70% and not greater than 90%.

A portion of the tread 4 from one of the tread reference ends Pe to the other of the tread reference ends Pe is a region (hereinafter, also referred to as normal ground contact region) that is to come into contact with a road surface in a typical running condition of the tire 2. From the viewpoint of effectively reinforcing the tread 4 portion (hereinafter, also referred to as tread portion), the belt 14 and the band 16 described above are disposed in the normal ground contact region. As shown in FIG. 1, the position of the end of the band 16 is almost the same as the position of the tread reference end Pe in the axial direction. In the tire 2, the band 16 has an axial width equivalent to the width WT of the tread 4. Specifically, a difference between the width WT of the tread 4 and the axial width of the band 16 is not less than −10 mm and not greater than 10 mm.

In FIG. 1, a length represented by a double-headed arrow WH is an axial width of the reference ground contact surface. The axial width WH represents a distance in the axial direction from one of the reference ground contact ends PH to the other of the reference ground contact ends PH.

In the tire 2, the tread reference end Pe is disposed outwardly of the reference ground contact end PH in the axial direction. In other words, the axial width WH of the reference ground contact surface is less than the width WT of the tread 4. Specifically, a ratio (WH/WT) of the axial width WH to the width WT of the tread 4 is not less than 70% and not greater than 90%.

As described above, in the tire 2, the tread 4 has the three circumferential grooves 26. In the tire 2, arrangement of the three circumferential grooves 26, the groove depth, and the groove width are not particularly limited. As the arrangement of the circumferential grooves of the tire, the groove depth, and the groove width, typical arrangement, groove depth, and groove width are applied to the tread 4.

In the tire 2, in the three circumferential grooves 26, the circumferential grooves 26 disposed on the outer side in the axial direction are shoulder circumferential grooves 26s. The circumferential groove 26 disposed inwardly of the shoulder circumferential grooves 26s is a middle circumferential groove 26m.

As described above, in the tire 2, the tread 4 has the four land portions 28. In the four land portions 28, the land portions 28 disposed on the equator plane side are middle land portions 28m, and the land portions 28 disposed outwardly of the middle land portions 28m are shoulder land portions 28s.

The shoulder land portion 28s includes the reference ground contact end PH. The middle circumferential groove 26m is disposed between the left and right middle land portions 28m. In the tire 2, the middle circumferential groove 26m is disposed on the equator plane. The middle circumferential groove 26m is also referred to as a center circumferential groove.

Figure 4:
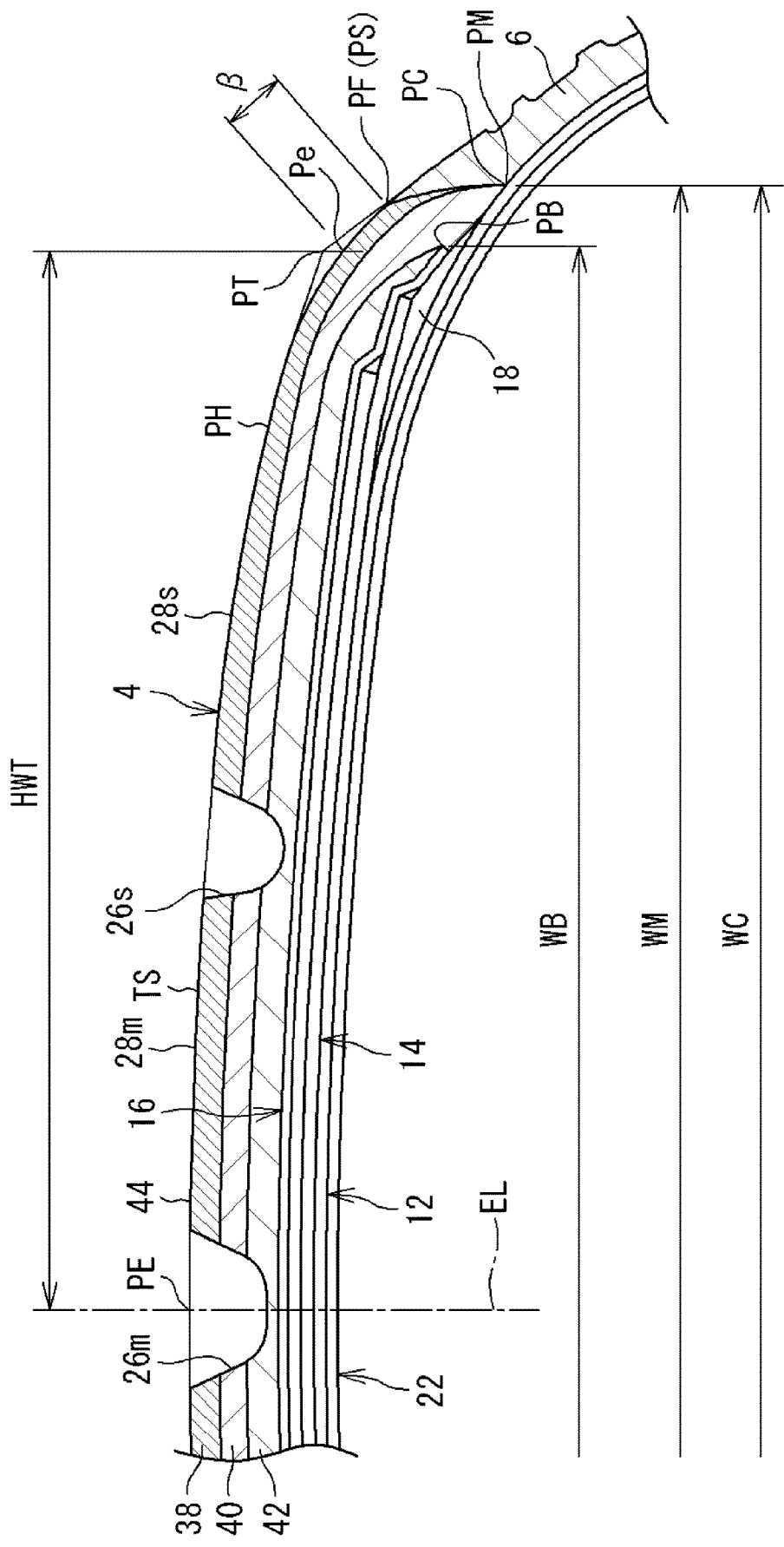
FIG. 4 is an enlarged cross-sectional view of a part of the tire in FIG. 1.

FIG. 4 shows a part of the tire 2 in FIG. 1. FIG. 4 shows the tread portion of the tire 2. In FIG. 4, the left-right direction represents the axial direction of the tire 2 and the up-down direction represents the radial direction of the tire 2. The direction perpendicular to the surface of the drawing sheet in FIG. 4 represents the circumferential direction of the tire 2. In FIG. 4, a length represented by reference character HWT is a distance in the axial direction from the equator plane to the tread reference end Pe. The axial distance HWT is half the width WT of the tread 4 described above, and is also referred to as tread half-width.

In the tire 2, the tread 4 includes a cap layer 38, an intermediate layer 40, and a base layer 42. The cap layer 38 forms a part of the tire outer surface TS. The intermediate layer 40 is disposed inwardly of the cap layer 38 in the radial direction. The base layer 42 is disposed inwardly of the intermediate layer 40 in the radial direction. As shown in FIG. 4, the cap layer 38 is stacked on the intermediate layer 40, and the intermediate layer 40 is stacked on the base layer 42. The cap layer 38, the intermediate layer 40, and the base layer 42 are formed so as to have an almost uniform thickness in a portion other than a portion near the tread reference end Pe described below.

In FIG. 4, a position represented by reference character PC is the outer end of the cap layer 38. A length represented by reference character WC is an axial width of the cap layer 38. The axial width WC represents a distance in the axial direction from one of the outer ends PC to the other of the outer ends PC. A position represented by reference character PM is the outer end of the intermediate layer 40. A length represented by reference character WM is the axial width of the intermediate layer 40. The axial width WM represents a distance in the axial direction from one of the outer ends PM to the other of the outer ends PM. A position represented by reference character PB is the outer end of the base layer 42. A length represented by reference character WB is the axial width of the base layer 42. The axial width WB represents a distance in the axial direction from one of the outer ends PB to the other of the outer ends PB.

As described above, the cap layer 38 forms a part of the tire outer surface TS. A portion, of the tire outer surface TS, formed of the cap layer 38 is a cap surface 44. A position represented by reference character PF is an outer end of the cap surface 44. In the tire 2, the outer end PF of the cap surface 44 is disposed outwardly of the tread reference end Pe in the axial direction. The outer end PC of the cap layer 38 is disposed inwardly of the outer end PF of the cap surface 44 in the radial direction. The outer end PC of the cap layer 38 is not on the tire outer surface TS. In a case where the outer end PC of the cap layer 38 is on the tire outer surface TS, the outer end PC of the cap layer 38 is also the outer end PF of the cap surface 44.

In FIG. 4, a position represented by reference character PS is the outer end of the tread 4 on the tire outer surface TS. In the tire 2, the outer end PF of the cap surface 44 coincides with the outer end PS of the tread 4. In the tire 2, the intermediate layer 40 disposed inwardly of the cap layer 38 is not exposed at the tire outer surface TS.

In the tire 2, the position of the outer end PC of the cap layer 38 coincides with the position of the outer end PM of the intermediate layer 40 in the radial direction. The position of the outer end PC of the cap layer 38 coincides with the position of the outer end PM of the intermediate layer 40 in the axial direction. In the tire 2, the position of the outer end PC of the cap layer 38 is adjusted as appropriate between the outer end PF of the cap surface 44 and the outer end PM of the intermediate layer 40 in consideration of influence on performance of the tire 2.

In the tire 2, the outer end PM of the intermediate layer 40 is disposed outwardly of the end of the belt 14 in the axial direction. The end of the band 16 is disposed between the outer end PM of the intermediate layer 40 and the end of the belt 14. In the tire 2, the intermediate layer 40 covers the ends of the belt 14 and the ends of the band 16. Particularly, from the viewpoint of preventing damage at the end of the belt 14, the length from the end of the belt 14 to the outer end PM of the intermediate layer 40 is preferably not less than 10 mm and preferably not greater than 15 mm.

In the tire 2, the base layer 42 is stacked on the band 16. The base layer 42 is reinforced by the band 16 and the belt 14 disposed inwardly of the band 16. From the viewpoint of effective reinforcement, in the tire 2, the axial width WB of the base layer 42 is preferably equal to the axial width of the band or less than the axial width of the band.

In the tire 2, the cap layer 38, the intermediate layer 40, and the base layer 42 are formed of crosslinked rubbers having different heat generation properties, respectively. In the tire 2, the cap layer 38 is most likely to generate heat and the base layer 42 is least likely to generate heat. The intermediate layer 40 has a heat generation property that is between the heat generation property of the cap layer 38 and the heat generation property of the base layer 42. In the tire 2, a loss tangent LTm of the intermediate layer 40 at 30° C. is less than a loss tangent LTc of the cap layer 38 at 30° C. A loss tangent LTb of the base layer 42 at 30° C. is less than the loss tangent LTm of the intermediate layer 40 at 30° C.

The loss tangent LTb of the base layer 42 at 30° C. is preferably not greater than 0.11. Thus, the base layer 42 effectively contributes to reduction of rolling resistance. From this viewpoint, the loss tangent LTb is more preferably not greater than 0.10 and even more preferably not greater than 0.09. The less the loss tangent LTb of the base layer 42 is, the better the effect is. Therefore, a preferable lower limit is not set.

The loss tangent LTm of the intermediate layer 40 at 30° C. is preferably not greater than 0.15. Thus, the intermediate layer 40 effectively contributes to reduction of rolling resistance. From this viewpoint, the loss tangent LTm is more preferably not greater than 0.14 and even more preferably not greater than 0.13. The loss tangent LTm of the intermediate layer 40 at 30° C. is preferably not less than 0.11. Thus, the intermediate layer 40 can assuredly have required stiffness and can effectively contribute to enhancement of wet performance. From this viewpoint, the loss tangent LTm is more preferably not less than 0.12.

The loss tangent LTc of the cap layer 38 at 30° C. is preferably not less than 0.15. Thus, the cap layer 38 can contribute to enhancement of wet performance. From this viewpoint, the loss tangent LTc is more preferably not less than 0.16 and even more preferably not less than 0.17. The cap layer 38 comes into contact with a road surface. From the viewpoint of enhancing wet performance, the greater the loss tangent LTc is, the better the effect is. However, in a case where the loss tangent LTc is great, heat generation is caused, and the cap layer 38 having generated heat may cause the temperature of the intermediate layer 40 to become higher than expected. From the viewpoint that the temperature of the entirety of the tread 4 is maintained stable and low rolling resistance can be maintained, the loss tangent LTc of the cap layer 38 at 30° C. is preferably not greater than 0.30, more preferably not greater than 0.28, and even more preferably not greater than 0.27.

In the tire 2, the outer end PC of the cap layer 38 is disposed outwardly of the outer end PB of the base layer 42 in the axial direction. The position of the outer end PC of the cap layer 38 coincides with the position of the outer end PB of the base layer 42 in the radial direction, or the outer end PC of the cap layer 38 is disposed inwardly of the outer end PB of the base layer 42 in the radial direction. In the tire 2, the cap layer 38 is disposed such that the cap layer 38 surrounds the base layer 42 from the outer side in the radial direction.

A portion, of the tire outer surface TS, which is to come into contact with a road surface is formed of the tread 4. In the tire 2, a portion that is to come into contact with a road surface is formed of the cap layer 38. In other words, the end of the portion that is to come into contact with a road surface is the end PF of the cap surface 44 described above. In the tire 2, the cap layer 38 comes into contact with a road surface also during cornering. In the tire 2, wet performance during cornering is enhanced.

In the tire 2, the cap layer 38 comes into contact with a road surface during not only straight running but also cornering. Rubber having a high grip force is used for the cap layer 38. Therefore, in the tire 2, the intermediate layer 40 disposed inwardly of the cap layer 38 can be formed of rubber produced in consideration of low-heat-generation property by slightly forgoing a grip force, instead of rubber that is likely to generate heat and is produced with placing a focus on a grip force. In the tire 2, although the outer side portion of the tread 4 is formed of the cap layer 38 that is likely to generate heat, the intermediate layer 40 disposed inwardly of the cap layer 38 contributes to reduction of rolling resistance. The tire 2 allows enhancement of wet performance during cornering without increasing rolling resistance.

In the tire 2, the outer end PM of the intermediate layer 40 is disposed outwardly of the outer end PB of the base layer 42 in the axial direction. The outer end PM of the intermediate layer 40 is disposed inwardly of the outer end PB of the base layer 42 in the radial direction. The position of the outer end PM of the intermediate layer 40 may coincide with the position of the outer end PB of the base layer 42 in the radial direction, which is not shown.

In the tire 2, the intermediate layer 40 is disposed such that the intermediate layer 40 surrounds the base layer 42 from the outer side in the radial direction. As described above, the cap layer 38 is disposed such that the cap layer 38 surrounds the intermediate layer 40 from the outer side in the radial direction. In other words, the cap layer 38 covers the intermediate layer 40 from the outer side and the intermediate layer 40 covers the base layer 42 from the outer side. In the tire 2, in the end portion of the tread 4 which vigorously moves during running, the intermediate layer 40 is effectively disposed between the cap layer 38 and the base layer 42. The intermediate layer 40 that is less likely to generate heat than the cap layer 38 effectively contributes to reduction of rolling resistance. A grip force is taken into consideration for the intermediate layer 40. Therefore, even when the cap layer 38 is worn, required wet performance is ensured also during cornering. In the tire 2, from the viewpoint of reducing rolling resistance and ensuring wet performance, the outer end PM of the intermediate layer 40 is preferably disposed outwardly of the outer end PB of the base layer 42 in the axial direction, and the position of the outer end PM of the intermediate layer 40 preferably coincides with the position of the outer end PB of the base layer 42 in the radial direction or the outer end PM of the intermediate layer 40 is preferably disposed inwardly of the outer end PB of the base layer 42 in the radial direction.

In cornering (hereinafter, also referred to as harsh cornering) in which a high inertial force is generated, an outer side portion disposed outwardly of the tread reference end Pe comes into contact with a road surface due to rolling of a vehicle, and the outer side portion is worn. Therefore, in harsh cornering, the base layer 42 may be exposed due to the outer side portion being worn. If the base layer 42 is exposed, separation of the tread 4 originating from the base layer 42 may occur. Therefore, the tire is required to not only enhance wet performance during cornering but also enhance durability during harsh cornering.

Figure 5:
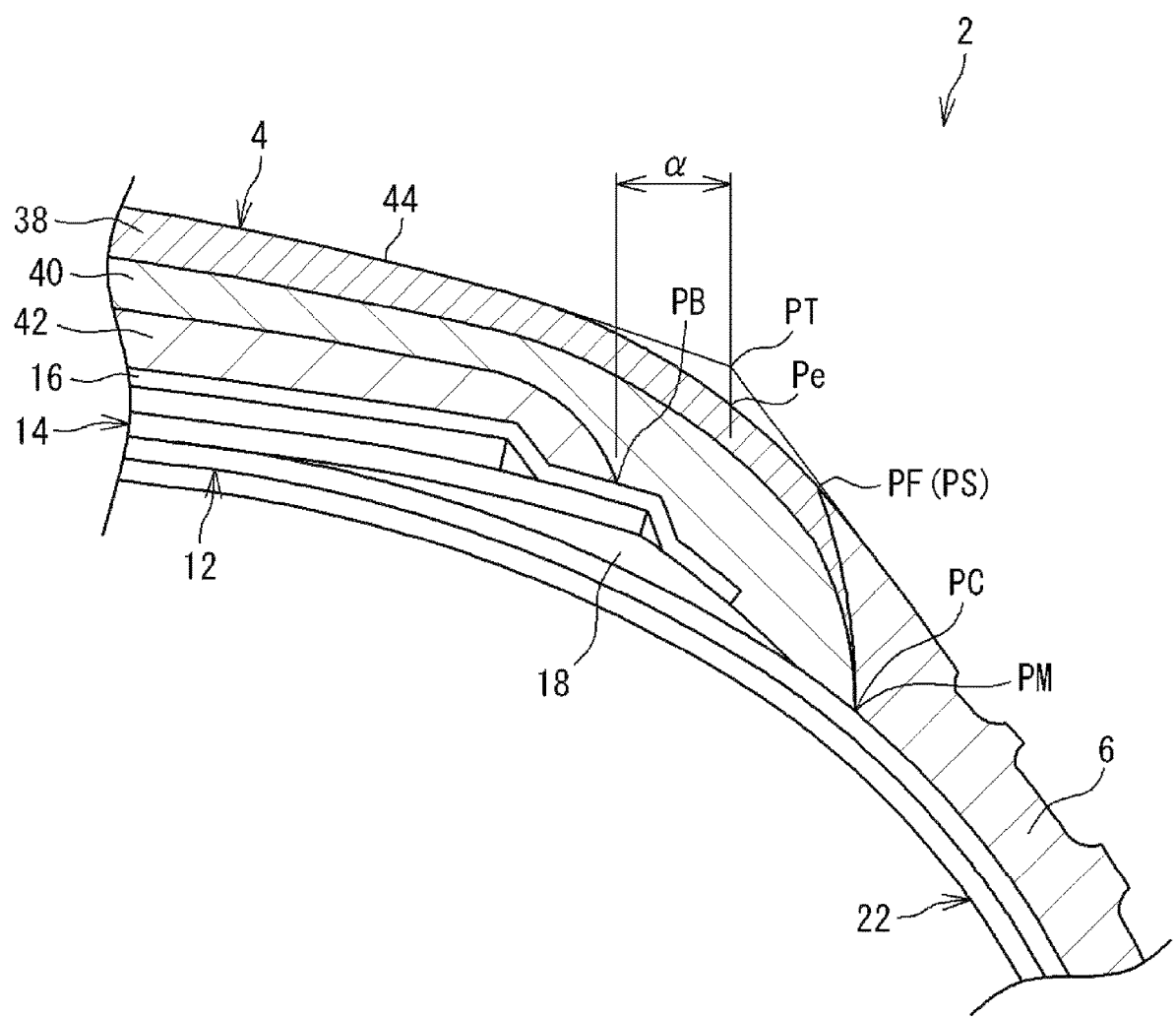
FIG. 5 is an enlarged cross-sectional view of a structure of a tread according to a modification.

As shown in FIG. 4, in the tire 2, the position of the outer end PB of the base layer 42 coincides with the position of the tread reference end Pe in the axial direction. As shown in FIG. 5, in the tire 2, the outer end PB of the base layer 42 may be disposed inwardly of the tread reference end Pe.

In the tire 2, the base layer 42 is disposed so as to be separated from the tire outer surface TS at the end portion of the tread 4. Thus, even when the outer side portion disposed outwardly of the tread reference end Pe is worn in harsh cornering, exposure of the base layer 42 is prevented. In the tire 2, durability in harsh cornering is enhanced. From this viewpoint, in the tire 2, the position of the outer end PB of the base layer 42 preferably coincides with the position of the tread reference end Pe in the axial direction, or the outer end PB of the base layer 42 is preferably disposed inwardly of the tread reference end Pe in the axial direction.

As described above, in the tire 2, the intermediate layer 40 is disposed between the cap layer 38 and the base layer 42. The intermediate layer 40 is more likely to generate heat than the base layer 42 and is less likely to generate heat than the cap layer 38. The tire 2 also allows enhancement of durability during harsh cornering while allowing reduction of rolling resistance.

In FIG. 5, a length represented by reference character $\alpha$ is an axial distance from the tread reference end Pe to the outer end PB of the base layer 42. The axial distance $\alpha$ is represented by a positive value in a case where the outer end PB of the base layer 42 is disposed outwardly of the tread reference end Pe, and the axial distance $\alpha$ is represented by a negative value in a case where the outer end PB of the base layer 42 is disposed inwardly of the tread reference end Pe.

In the tire 2, in a case where the outer end PB of the base layer 42 is disposed inwardly of the tread reference end Pe in the axial direction, a ratio ($\alpha$/HWT) of the axial distance $\alpha$ to the tread half-width HWT is preferably not less than −10.0% and more preferably not less than −6.0%, from the viewpoint of reducing rolling resistance. From the viewpoint of enhancing durability during harsh cornering, the ratio ($\alpha$/HWT) is preferably not greater than 3.0% and more preferably not greater than 0.0%.

In FIG. 4, a length represented by reference character $\beta$ is a length from the tread reference end Pe to the outer end PF of the cap surface 44. The length $\beta$ is measured along the tire outer surface TS on the meridian cross-section of the tire 2.

In the tire 2, a ratio (($\beta$+HWT)/HCW) of the total ($\beta$+HWT) of the tread half-width HWT and the length $\beta$ from the tread reference end Pe to the outer end PF of the cap surface 44, relative to the ground contact half-width HCW, is preferably not less than 1.15 and not greater than 1.20.

The ratio (($\beta$+HWT)/HCW) is set to be not less than 1.15, whereby a portion that comes into contact with a road surface during cornering is formed of the cap layer 38. In the tire 2, wet performance during cornering is enhanced. From this viewpoint, the ratio (($\beta$+HWT)/HCW) is more preferably not less than 1.16.

The ratio (($\beta$+HWT)/HCW) is set to be not greater than 1.20, whereby a volume of the cap layer 38 included in the end portion of the tread 4 is appropriately maintained. In the tire 2, influence of the cap layer 38 on rolling resistance is reduced. From this viewpoint, the ratio (($\beta$+HWT)/HCW) is more preferably not greater than 1.19.

Figure 6:
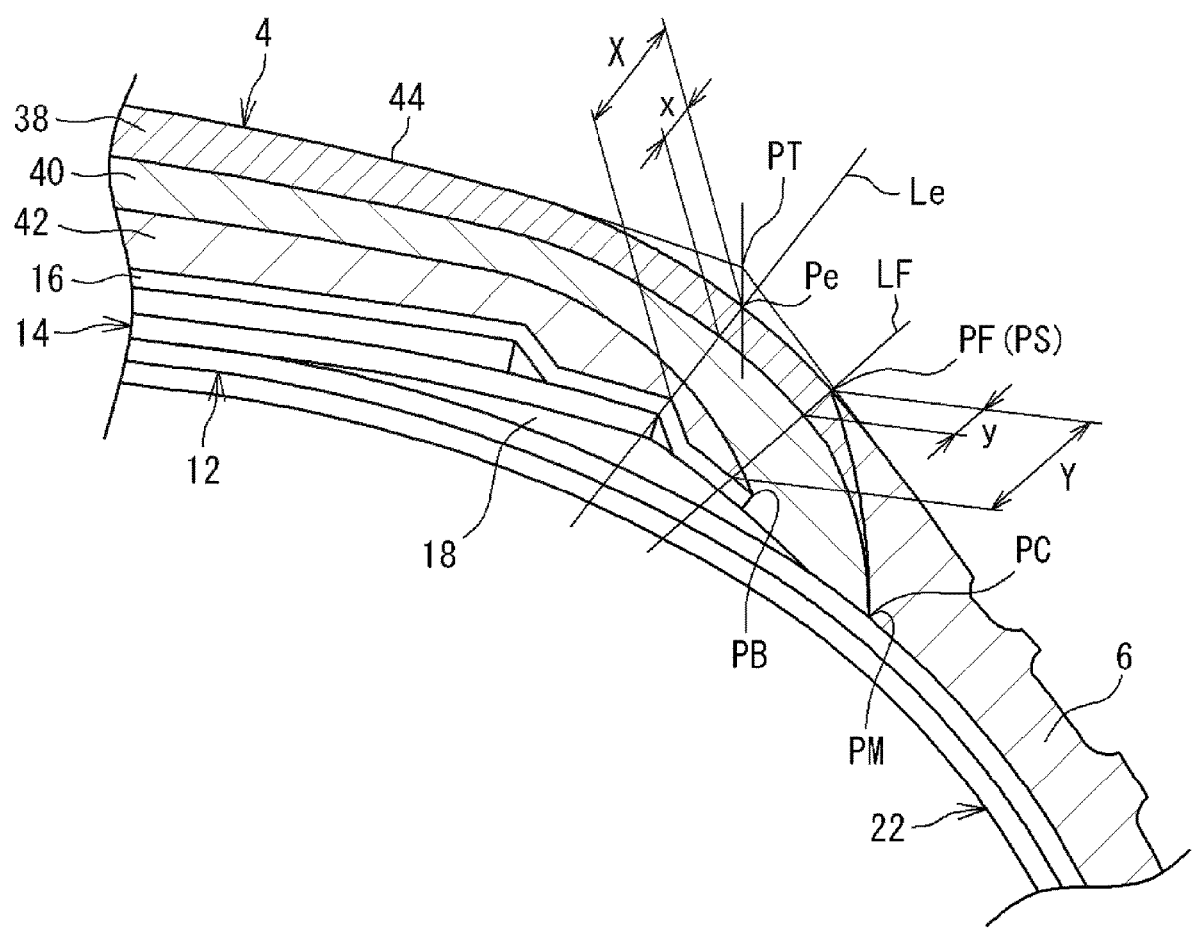
FIG. 6 is an enlarged cross-sectional view of a part of the tire in FIG. 4.

FIG. 6 shows a part of the tire 2 shown in FIG. 4. FIG. 6 shows a shoulder portion of the tire 2. In FIG. 6, the left-right direction represents the axial direction of the tire 2 and the up-down direction represents the radial direction of the tire 2. The direction perpendicular to the surface of the drawing sheet in FIG. 6 represents the circumferential direction of the tire 2.

In FIG. 6, a solid line Le represents a line that is normal to the tire outer surface TS and extends through the tread reference end Pe. A length represented by a double-headed arrow X is a thickness of the tread 4 measured along the normal line Le. The thickness X represents a thickness of the tread 4 at the tread reference end Pe. A length represented by a double-headed arrow x is a thickness of the cap layer 38 measured along the normal line Le. The thickness x represents a thickness of the cap layer 38 at the tread reference end Pe.

In the tire 2, a ratio (x/X) of the thickness x of the cap layer 38 to the thickness X of the tread at the tread reference end Pe is preferably not less than 15% and not greater than 35%.

The ratio (x/X) is set to be not less than 15%, whereby the thickness required for the cap layer 38 at the tread reference end Pe is ensured. In the tire 2, the cap layer 38 effectively contributes to enhancement of wet performance during cornering. From this viewpoint, the ratio (x/X) is more preferably not less than 20%.

The ratio (x/X) is set to be not greater than 35%, whereby the thickness of the cap layer 38 at the tread reference end Pe is appropriately maintained. In the tire 2, influence of the cap layer 38 on rolling resistance is effectively reduced. From this viewpoint, the ratio (x/X) is more preferably not greater than 30%.

In FIG. 6, a solid line LF represents a line that is normal to the tire outer surface TS and extends through the outer end PF of the cap surface 44. A length represented by a double-headed arrow Y is the thickness of the tread 4 measured along the normal line LF. The thickness Y represents the thickness of the tread 4 at the outer end PF of the cap surface 44. A length represented by a double-headed arrow y is the thickness of the cap layer 38 measured along the normal line LF. The thickness y represents the thickness of the cap layer 38 at the outer end PF of the cap surface 44.

In the tire 2, at the outer end PF of the cap surface 44, a ratio (y/Y) of the thickness y of the cap layer 38 to the thickness Y of the tread is preferably not less than 15% and not greater than 35%.

The ratio (y/Y) is set to be not less than 15%, whereby the thickness required for the cap layer 38 at the outer end PF of the cap surface 44 is ensured. In the tire 2, the cap layer 38 effectively contributes to enhancement of wet performance during cornering. From this viewpoint, the ratio (y/Y) is more preferably not less than 20%.

The ratio (y/Y) is set to be not greater than 35%, whereby the thickness of the cap layer 38 at the outer end PF of the cap surface 44 is appropriately maintained. In the tire 2, influence of the cap layer 38 on rolling resistance is effectively reduced. From this viewpoint, the ratio (y/Y) is more preferably not greater than 30%.

In the tire 2, a portion, of the tread 4, formed of the cap layer 38 and the intermediate layer 40 corresponds to a cap layer of a tread that is formed of the cap layer and a base layer in a conventional tire. From the viewpoint that the tread 4 can effectively contribute to enhancement of wet performance and reduction of rolling resistance, a ratio (LTc/LTm) of the loss tangent LTc of the cap layer 38 at 30° C. to the loss tangent LTm of the intermediate layer 40 at 30° C. is preferably not less than 110% and not greater than 250%. The ratio (LTc/LTm) is more preferably not less than 130% and even more preferably not less than 150%. The ratio (LTc/LTm) is more preferably not greater than 240% and even more preferably not greater than 230%.

In the tire 2, if abrasion resistance of the cap layer 38 and abrasion resistance of the intermediate layer 40 diverge from each other, an abrasion amount may be different between the cap layer 38 and the intermediate layer 40 during harsh cornering. In this case, a stepped portion may be generated near a boundary between the cap layer 38 and the intermediate layer 40 to cause damage originating from the stepped portion. From the viewpoint of enhancing durability during harsh cornering, the LAT abrasion index of the cap layer and the LAT abrasion index of the intermediate layer are preferably almost equal to each other. Specifically, a difference between the LAT abrasion index of the cap layer and the LAT abrasion index of the intermediate layer is preferably not less than −10 and not greater than 10.

As described above, according to the present disclosure, the tire that allows enhancement of wet performance during cornering without increasing rolling resistance is obtained.

EXAMPLES

The present disclosure will be described below in more detail according to examples and the like. However, the present disclosure is not limited only to the examples.

Example 1

A pneumatic tire (tire size=205/55R16), for a passenger car, having the basic structure shown in FIG. 1 and the specifications indicated below in Table 1 was obtained. The tread half-width HWT was 89 mm and the ground contact half-width HCW was 80 mm.

A tread including a cap layer, an intermediate layer, and a base layer, and having the structure shown in FIG. 4 was used. The loss tangent LTc of the cap layer at 30° C. was 0.27. The loss tangent LTm of the intermediate layer at 30° C. was 0.12. The loss tangent LTb of the base layer at 30° C. was 0.10.

In Example 1, a ratio ($\alpha$/HWT) of the axial distance $\alpha$ from the tread reference end Pe to the outer end PB of the base layer, relative to the tread half-width HWT, was 0.0%. A ratio (($\beta$+HWT)/HCW) of the total ($\beta$+HWT) of the tread half-width HWT and the length $\beta$ from the tread reference end Pe to the outer end PC of the cap surface, relative to the ground contact half-width HCW, was 1.18. At the tread reference end Pe, a ratio (x/X) of the thickness x of the cap layer to the thickness X of the tread was 20%. At the outer end PF of the cap surface, a ratio (y/Y) of the thickness y of the cap layer to the thickness Y of the tread was 20%. A difference (LATc-LATm) between the LAT abrasion index of the cap layer and the LAT abrasion index of the intermediate layer was 0.

Comparative Example 1

Figure 7:
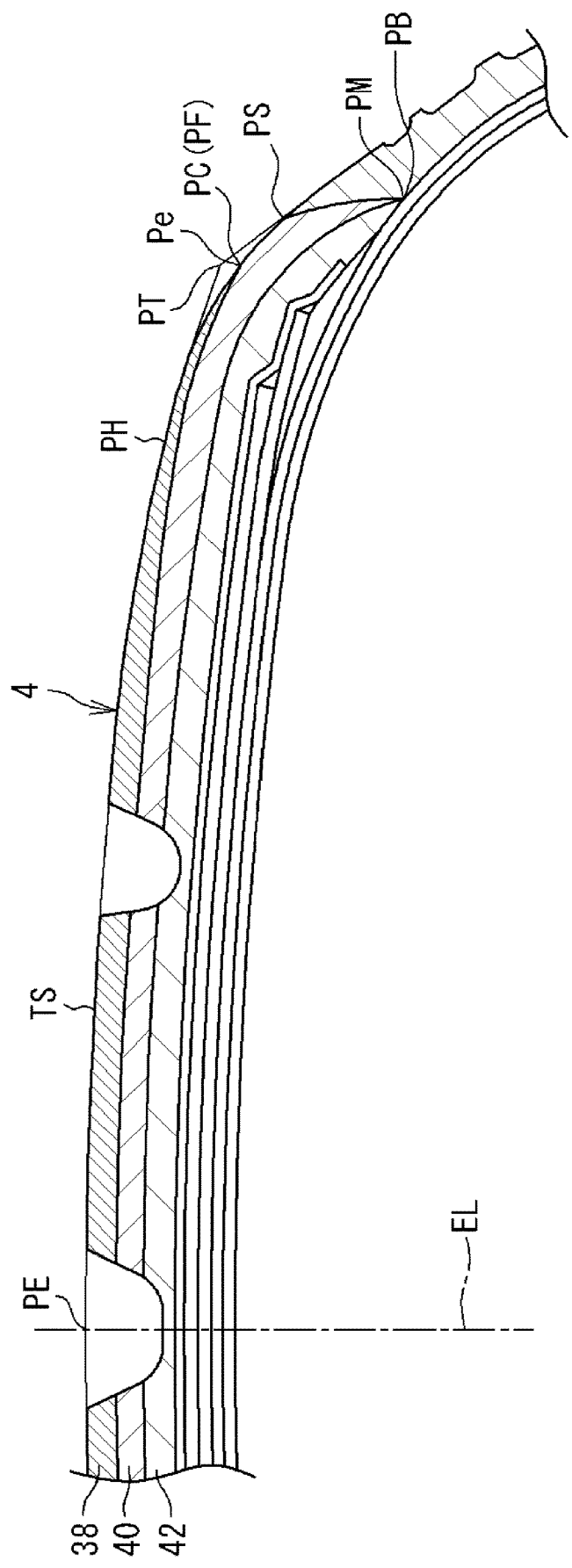
FIG. 7 is an enlarged cross-sectional view of a part of a tire of comparative example 1.

A tire of comparative example 1 was obtained in the same manner as in example 1 except that the structure of the tread was as shown in FIG. 7, and the ratio (α/HWT), the ratio ((β+HWT)/HCW), the ratio (x/X), and the ratio (y/Y) were as indicated below in Table 1. The structure of the tread of comparative example 1 was a conventional one.

Examples 2 and 3

Tires of examples 2 and 3 were each obtained in the same manner as in example 1 except that the ratio (α/HWT) was as indicated below in Table 1.

Example 4

A tire of example 4 was obtained in the same manner as in example 1 except that the ratio ((β+HWT)/HCW) was as indicated below in Table 2.

Examples 5 and 6

Tires of examples 5 and 6 were each obtained in the same manner as in example 1 except that the ratio (x/X) and the ratio (y/Y) were as indicated below in Table 2.

Example 7

A tire of example 7 was obtained in the same manner as in example 1 except that a cap layer was formed of a rubber composition having an enhanced grip force and the difference (LATc-LATm) was as indicated below in Table 2. In example 7, the loss tangent LTc of the cap layer at 30° C. was 0.30.

[Rolling Resistance Coefficient (RRC)]

A rolling resistance coefficient (RRC) was measured by using a rolling resistance testing machine when running with the test tire on a drum under the following conditions was performed at a speed of 80 km/h. The results are indicated below as indexes in Tables 1 and 2. The greater the value is, the lower rolling resistance of the tire is.

Rim: 16×6.5J
Internal pressure: 250 kPa
Vertical load: 4.82 kN

[Durability (DRY) During Harsh Cornering]

The test tire was mounted on a rim (size=16×7J), and was inflated with air to adjust an internal pressure of the tire to 250 kPa. The tire was mounted to a test vehicle (passenger car). The test vehicle was caused to perform cornering in an understeer state on a dry road surface in a circular test course. The running speed was set to 100 km/h. After running 30 laps, a worn state was checked at a buttress portion of the tire, and the tire was evaluated based on the number of cracks and the length of the crack. The results are indicated below in Tables 1 and 2. The greater the value is, the more excellent durability during harsh cornering is. In this evaluation, an index of not less than 100 was set as being acceptable.

[Wet Performance (WET) During Cornering]

The test tire was mounted on a rim (size=16×7J) and was inflated with air to adjust an internal pressure of the tire to 250 kPa. The tire was mounted to a test vehicle (passenger car). The test vehicle was caused to run on a wet road surface (water film thickness=1.4 mm) in a test course and a lap time was measured. The results are indicated below as indexes in Tables 1 and 2. The greater the value is, the more excellent wet performance during cornering is. In this evaluation, an index of not less than 100 was set as being acceptable.

TABLE 1

|  | Comparative example 1 | Example 2 | Example 3 | Example 1 |
|---|---|---|---|---|
| α/HWT [%] | 11.2 | −5.6 | 3.4 | 0.0 |
| (β + HTW)/HCW [—] | 1.11 | 1.18 | 1.18 | 1.18 |
| x/X [%] | 0 | 20 | 20 | 20 |
| y/Y [%] | 0 | 20 | 20 | 20 |
| LATc − LATm [—] | 0 | 0 | 0 | 0 |
| RRC | 100 | 103 | 105 | 104 |
| DRY | 90 | 105 | 100 | 105 |
| WET | 90 | 105 | 105 | 105 |

TABLE 2

|  | Example 4 | Example 5 | Example 6 | Example 7 |
|---|---|---|---|---|
| α/HWT [%] | 0.0 | 0.0 | 0.0 | 0.0 |
| (β + HTW)/HCW [—] | 1.15 | 1.18 | 1.18 | 1.18 |
| x/X [%] | 20 | 30 | 30 | 20 |
| y/Y [%] | 20 | 20 | 30 | 20 |
| LATc − LATm [—] | 0 | 0 | 0 | 5 |
| RRC | 104 | 102 | 101 | 103 |
| DRY | 105 | 105 | 105 | 103 |
| WET | 100 | 105 | 105 | 105 |

As indicated in Tables 1 and 2, in the examples, it was confirmed that enhancement of wet performance during cornering was achieved without increasing rolling resistance. The evaluation results clearly indicate that the technique in the present disclosure is superior.

The technique for allowing enhancement of wet performance during cornering without increasing rolling resistance as described above is also applicable to various tires.

Preferably, in the tire, an outer end of the intermediate layer is disposed outwardly of the outer end of the base layer in the axial direction, and a position of the outer end of the intermediate layer coincides with the position of the outer end of the base layer in the radial direction, or the outer end of the intermediate layer is disposed inwardly of the outer end of the base layer in the radial direction.

Preferably, in the tire, the position of the outer end of the base layer coincides with a position of the tread reference end in the axial direction, or the outer end of the base layer is disposed inwardly of the tread reference end in the axial direction.

In the tire, a ground contact surface obtained by mounting the tire on a normal rim, adjusting an internal pressure of the tire to a normal internal pressure, applying a load that is 70% of a normal load, to the tire, as a vertical load, and bringing the tire into contact with a planar road surface, is preferably a reference ground contact surface. Half a ground contact width of the reference ground contact surface is preferably a ground contact half-width. A portion formed of the cap layer in the outer surface of the tire is preferably a cap surface. An outer end of the cap surface is preferably disposed outwardly of the tread reference end in the axial direction. On a meridian cross-section of the tire, a ratio of a total of the tread half-width and a length, measured along the outer surface of the tire, from the tread reference end to the outer end of the cap surface, relative to the ground contact half-width, is preferably not less than 1.15 and not greater than 1.20.

Preferably, in the tire, a ratio of a thickness of the cap layer to a thickness of the tread at the tread reference end is not less than 15% and not greater than 35%.

Preferably, in the tire, a ratio of a thickness of the cap layer to a thickness of the tread at an outer end of a cap surface, is not less than 15% and not greater than 35%.

Preferably, in the tire, a difference between a LAT abrasion index of the cap layer and a LAT abrasion index of the intermediate layer is not less than −10 and not greater than 10.

According to the present disclosure, the tire that allows enhancement of wet performance during cornering without increasing rolling resistance is obtained.

What is claimed is:

1. A tire comprising:
a tread configured to come into contact with a road surface,
wherein an outer surface of the tire comprises a tread surface and a pair of side surfaces continuous with ends of the tread surface,
wherein, on a meridian cross-section of the tire, a contour of the tread surface comprises a plurality of curved contour lines formed as arcs having different radii,
wherein a contour of the outer surface of the tire comprises, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion,
wherein a tread reference end is an intersection point of the outer surface of the tire, and a straight line extending in a radial direction through an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other,
wherein an axial distance from an equator plane to the tread reference end is a tread half-width,
wherein the tread comprises a cap layer forming a part of the outer surface of the tire, an intermediate layer disposed inwardly of the cap layer in the radial direction, and a base layer disposed inwardly of the intermediate layer in the radial direction,
wherein a loss tangent of the intermediate layer at 30° C. is less than a loss tangent of the cap layer at 30° C., and a loss tangent of the base layer at 30° C. is less than the loss tangent of the intermediate layer at 30° C.,
wherein an outer end of the cap layer is disposed outwardly of an outer end of the base layer in the axial direction,
wherein a position of the outer end of the cap layer coincides with a position of the outer end of the base layer in the radial direction, or the outer end of the cap layer is disposed inwardly of the outer end of the base layer in the radial direction,
wherein a ground contact surface obtained by mounting the tire on a normal rim, adjusting an internal pressure of the tire to a normal internal pressure, applying a load that is 70% of a normal load, to the tire, as a vertical load, and bringing the tire into contact with a planar road surface, is a reference ground contact surface,
wherein half a ground contact width of the reference ground contact surface is a ground contact half-width,
wherein a portion formed of the cap layer in the outer surface of the tire is a cap surface,
wherein an outer end of the cap surface is disposed outwardly of the tread reference end in the axial direction, and
wherein, on a meridian cross-section of the tire, a ratio of a total of the tread half-width and a length, measured along the outer surface of the tire, from the tread reference end to the outer end of the cap surface, relative to the ground contact half-width, is not less than 1.15 and not greater than 1.20.

2. The tire according to claim 1,
wherein an outer end of the intermediate layer is disposed outwardly of the outer end of the base layer in the axial direction, and
wherein a position of the outer end of the intermediate layer coincides with the position of the outer end of the base layer in the radial direction, or the outer end of the intermediate layer is disposed inwardly of the outer end of the base layer in the radial direction.

3. The tire according to claim 1, wherein the position of the outer end of the base layer coincides with a position of the tread reference end in the axial direction, or the outer end of the base layer is disposed inwardly of the tread reference end in the axial direction.

4. The tire according to claim 1, wherein a ratio of a thickness of the cap layer to a thickness of the tread at the tread reference end is not less than 15% and not greater than 35%.

5. The tire according to claim 4, wherein a ratio of a thickness of the cap layer to a thickness of the tread at an outer end of a cap surface, is not less than 15% and not greater than 35%.

6. The tire according to claim 1, wherein a difference between a LAT abrasion index of the cap layer and a LAT abrasion index of the intermediate layer is not less than −10 and not greater than 10.

7. The tire according to claim 1, wherein
the loss tangent of the base layer at 30° C. is not greater than 0.11,
the loss tangent of the intermediate layer at 30° C. is not greater than 0.15 and not less than 0.11, and
the loss tangent of the cap layer at 30° C. is not less than 0.15 and not greater than 0.30.

8. The tire according to claim 1, wherein the cap layer, the intermediate layer and the base layer have a uniform thickness.

9. The tire according to claim 1, wherein the cap layer is disposed such that the cap layer surrounds the base layer from an outer side in the radial direction, and
wherein the intermediate layer is disposed such that the intermediate layer surrounds the base layer from the outer side in the radial direction.

10. The tire according to claim 1, wherein a ratio of the axial distance from the tread reference end to the outer end of the base layer to the tread half-width is not less than −10.0% and not greater than 3.0%.

11. The tire according to claim 1, wherein a ratio of a thickness of the cap layer to a thickness of the tread at the tread reference end is not less than 20% and not greater than 30%.

12. The tire according to claim 1, wherein a ratio of the loss tangent of the cap layer at 30° C. to the loss tangent of the intermediate layer at 30° C. is not less than 110% and not greater than 250%.

13. The tire according to claim 1, wherein the tire further comprises:
a pair of sidewalls, and each sidewall is continuous with an end of the tread and disposed inwardly of the tread in the radial direction,
a pair of clinches, and each clinch is disposed inwardly of the sidewall in the radial direction and each clinch is configured to contact a rim,
a pair of beads, and each bead is disposed inwardly of the clinch in the axial direction,
a carcass disposed inwardly of the tread, the pair of sidewalls, and the pair of clinches, in the radial direction, and the carcass extends on and between one of the beads and the other of the beads,
a belt disposed inwardly of the tread in the radial direction and stacked on the carcass from an outer side in the radial direction,
a band disposed between the tread and the belt in the radial direction, and stacked on the belt in a portion inward of the tread,
a pair of cushions spaced from each other in the axial direction and disposed between the carcass, an end of the belt, and an end of the band,
a pair of chafers, and each chafer is disposed inwardly of the bead in the radial direction, and
an inner liner disposed inwardly of the carcass in the radial direction and forms an inner surface of the tire.

14. A tire comprising:
a tread configured to come into contact with a road surface,
wherein an outer surface of the tire comprises a tread surface and a pair of side surfaces continuous with ends of the tread surface,
wherein, on a meridian cross-section of the tire, a contour of the tread surface comprises a plurality of curved contour lines formed as arcs having different radii,
wherein a contour of the outer surface of the tire comprises, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion,
wherein a tread reference end is an intersection point of the outer surface of the tire, and a straight line extending in a radial direction through an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other,
wherein an axial distance from an equator plane to the tread reference end is a tread half-width,
wherein the tread comprises a cap layer forming a part of the outer surface of the tire, an intermediate layer disposed inwardly of the cap layer in the radial direction, and a base layer disposed inwardly of the intermediate layer in the radial direction,
wherein a loss tangent of the intermediate layer at 30° C. is less than a loss tangent of the cap layer at 30° C., and
a loss tangent of the base layer at 30° C. is less than the loss tangent of the intermediate layer at 30° C.,
wherein an outer end of the cap layer is disposed outwardly of an outer end of the base layer in the axial direction,
wherein a position of the outer end of the cap layer coincides with a position of the outer end of the base layer in the radial direction, or the outer end of the cap layer is disposed inwardly of the outer end of the base layer in the radial direction,
wherein an outer end of the intermediate layer is disposed outwardly of the outer end of the base layer in the axial direction,
wherein a position of the outer end of the intermediate layer coincides with the position of the outer end of the base layer in the radial direction, or the outer end of the intermediate layer is disposed inwardly of the outer end of the base layer in the radial direction,
wherein a ratio of a thickness of the cap layer to a thickness of the tread at the tread reference end is not less than 15% and not greater than 35%,
wherein a thickness of the intermediate layer increases as it extends towards the tread reference end in the axial direction, and
wherein a thickness of the base layer decreases as it extends towards the tread reference end in the axial direction.

15. The tire according to claim 14, wherein
the loss tangent of the base layer at 30° C. is not greater than 0.11,
the loss tangent of the intermediate layer at 30° C. is not greater than 0.15 and not less than 0.11, and
the loss tangent of the cap layer at 30° C. is not less than 0.15 and not greater than 0.30.

16. The tire according to claim 14, wherein a ratio of the loss tangent of the cap layer at 30° C. to the loss tangent of the intermediate layer at 30° C. is not less than 150% and not greater than 230%.

17. The tire according to claim 14, wherein a ratio of a thickness of the cap layer to the thickness of the tread at an outer end of a cap surface, is not less than 20% and not greater than 30%.

18. The tire according to claim 14, wherein
the tire defines a reference ground contact surface,
the reference ground contact surface of the tire is obtained when the tire is mounted on a normal rim, an internal pressure of the tire is adjusted to a normal internal pressure, a vertical load is applied to the tire that is 70% of a normal load and the tire is brought into contact with a planar road surface,
half a ground contact width of the reference ground contact surface is a ground contact half-width,
a portion formed of the cap layer in the outer surface of the tire is a cap surface,
an outer end of the cap surface is disposed outwardly of the tread reference end in the axial direction, and
on a meridian cross-section of the tire, a ratio of a total of the tread half-width and a length, measured along the outer surface of the tire, from the tread reference end to the outer end of the cap surface, relative to the ground contact half-width, is not less than 1.16 and not greater than 1.19.

19. A tire comprising:
a tread configured to come into contact with a road surface, wherein an outer surface of the tire comprises a tread surface and a pair of side surfaces continuous with ends of the tread surface, wherein, on a meridian cross-section of the tire, a contour of the tread surface comprises a plurality of curved contour lines formed as arcs having different radii, wherein a contour of the outer surface of the tire comprises, in each of end portions of the tread surface, a curved line portion that is formed as a curved contour line connected to a corresponding one of the side surfaces and is formed as an arc having a smallest radius among the plurality of curved contour lines included in the contour of the tread surface, an inner adjacent contour line disposed inwardly of the curved line portion in an axial direction in contact with the curved line portion, and an outer adjacent contour line disposed outwardly of the curved line portion in the axial direction in contact with the curved line portion, wherein a tread reference end is an intersection point of the outer surface of the tire, and a straight line extending in a radial direction through an intersection point of a line tangent to the curved line portion at a contact point at which the inner adjacent contour line and the curved line portion are in contact with each other, and a line tangent to the curved line portion at a contact point at which the outer adjacent contour line and the curved line portion are in contact with each other, wherein an axial distance from an equator plane to the tread reference end is a tread half-width, wherein the tread comprises a cap layer forming a part of the outer surface of the tire, an intermediate layer disposed inwardly of the cap layer in the radial direction, and a base layer disposed inwardly of the intermediate layer in the radial direction, wherein a loss tangent of the intermediate layer at 30° C. is less than a loss tangent of the cap layer at 30° C., and a loss tangent of the base layer at 30° C. is less than the loss tangent of the intermediate layer at 30° C., wherein an outer end of the cap layer is disposed outwardly of an outer end of the base layer in the axial direction, wherein a position of the outer end of the cap layer coincides with a position of the outer end of the base layer in the radial direction, or the outer end of the cap layer is disposed inwardly of the outer end of the base layer in the radial direction, wherein a thickness of the intermediate layer increases as it extends towards the tread reference end in the axial direction, and wherein a thickness of the base layer decreases as it extends towards the tread reference end in the axial direction.

\* \* \* \* \*